3,690,860
METHOD FOR CONTROLLING SLIME IN AQUEOUS SYSTEMS
Murrell L. Salutsky, Highland Park, and Salem Shair, Chicago, Ill., assignors to Chemed Corporation, Cincinnati, Ohio
No Drawing. Filed Mar. 17, 1970, Ser. No. 20,432
Int. Cl. A01n *11/04*
U.S. Cl. 71—67                                 5 Claims

ABSTRACT OF THE DISCLOSURE

The formation and/or growth of slime in aqueous systems is controlled by adding to the water in such systems a slime inhibiting amount of a water soluble inorganic salt of monopersulfuric acid. Improved slime control is obtained when the inorganic monopersulfate salt is used together with an alkali metal halide.

---

The present invention is concerned with slime control.

Slime consists of certain biological organisms, many of them microscopic; accumulations caused by such organisms; and organic matter. The resulting deposits, called slime, are of varying characteristics, ranging from stringy, pasty, and gelatinous, to hard and horny.

The development of slime constitutes a major problem wherever it occurs, but particularly in bodies of water. For example, slime formation is a problem in many industrial applications where water is employed, such as air conditioning units, reservoirs, in water-purifying systems, and the like.

The development of slime in any site is generally undesirable. The mass which it forms reduces the effective diameter of pipes and other members in circulating systems. Wherever the body of water in which the slime develops is itself involved in the production of some substance—such as in the production of paper in the paper industry—the presence of slime will contaminate the product, coloring it, giving it an odor, and typically reducing its strength. The development of slime frequently reduces the efficiency of a body of water being employed industrially; for example, in cooling towers and air conditioning units, the growth of slime on portions thereof reduces severely the efficiency of the tower or unit to dispel heat. In such situations, the development of slime requires frequent removal, a costly and time-consuming operation. For these and other reasons, the prevention of the development of slime is of great importance.

The biological organisms most typically involved in the development of slime are algae, bacteria, and fungi. The most notorious slime-producing members of such groups are those which secrete a gelatinous material surrounding the cells as a capsule or sheath. Such organisms thereby produce materials which contribute significantly to the bulk of the resulting slime. Moreover, such secretion has the effect of embedding the organism, thereby making it more resistant to control.

While the particular organisms present in the development of slime vary greatly from location to location, and even at a given location, from time to time, representative slime-forming organisms include: Aspergillus spp.; Penicillium spp.; Candida spp.; Saccharomyces spp.; Aerobacter spp.; Escherichia spp.; Alcaligenes spp.; and Bacillus spp. Yet other organisms involved in slime development include: Chlorella spp.; Spirogyra spp.; Oscillatoria spp.; Vaucheria spp.; Pseudomonas spp.; Salmonella spp.; Staphylococcus spp.; Pullularia spp.; and Rhizopus spp. It will be apparent that any reasonably good slime control agent must be effective against a broad spectrum of microorganisms. In addition it should be non-toxic and should not impart odor, taste, or color to the aqueous system being treated or to the products produced or treated in such systems.

The present invention is directed to an improved slime control method for aqueous systems in which there is employed an inorganic monopersulfate salt which is soluble at the concentrations used in the water in such systems.

The monopersulfate salts which may be used in accordance with the method of this invention may be conveniently represented by the formula $$M(HSO_5)_x$$

where M is ammonium ($NH_4^+$), or a mono-, di- or trivalent metal such as the alkali metals (sodium (Na), potassium (K), etc.), the alkaline earth metals (calcium (Ca), barium (Ba), etc.) or such other metals as zinc (Zn) and aluminum (Al). Preparation of stable monopersulfate salts useful in the practice of this invention has been described, for example, in United States Patent 2,802,722 granted to S. E. Stephanou, Aug. 13, 1957. The most especially preferred salts are the alkali metal and ammonium salts, in particular potassium monopersulfate.

A composition containing the potassium monopersulfate ($KHSO_5$) salt as active ingredient (together with potassium sulfate ($K_2SO_4$) and potassium acid sulfate ($KHSO_4$) is commercially available from E. I. du Pont de Nemours & Co. (Inc.) ("Du Pont"), Wilmington, Del. under the registered trademark "Oxone." According to the manufacturer "Oxone" has the following characteristics:

Appearance—White, granular solid
Active component—Potassium monopersulfate
Active oxygen—4.5% minimum
Odor—None
Particle size:
    Thru 30 mesh—100%
    Thru 200 mesh—10% max.
Bulk density—75–80 lb./cu. ft.
pH (1% solution)—2–3
Solubility:
    80° Fahrenheit—26.8 grams per 100 grams water
    120° Fahrenheit—30.0 grams per 100 grams water In a trade bulletin (A–33716, Rev. 5–64) concerning "Oxone" Du Pont has disclosed that the product has useful anti-bacterial effects when used at a temperature of 140° Fahrenheit or higher. Combinations of Oxone with chloride ion are also suggested. Typical suggested uses for Oxone are in home laundry bleaches, stain removers, bleach-detergent products, wash bowl and toilet bowl cleansers, swimming pool sanitizers and in hygienic products such as denture cleansers and foot powders. Use of monopersulfates in combination with iodide salts for the treatment of swimming pools is disclosed in U.S. Patent 3,232,869 granted to A. J. Gard, Feb. 1, 1966.

In accordance with the present invention it has been discovered inorganic monopersulfate salts have broad spectrum microbiocidal properties rendering them effective for control of slimes in aqueous systems. We have also discovered that the slime control effectiveness of the monopersulfate salts is enhanced by use of an alkali metal halide, especially alkali metal chloride such as sodium potassium or ammonium chloride, in conjunction therewith.

The method of the present invention for controlling slime in an aqueous system comprises adding to the aqueous system a slimicidal amount of one or more soluble inorganic persulfate salts. By the term "slimicidal" amount we mean an amount which kills, inhibits the growth of or prevents the growth of, the slime-producing organisms.

The amount of persulfate salt which is slimicidal varies with the particular organisms present in a given body of water, the method of application of the salt, and the nature and the amount of other additives present. The amount varies, moreover, with the degree to which the persulfate is gradually removed from the aqueous system and with the frequency of treatment. An amount which will provide from 50 to 300 or more parts of the active persulfate by weight per million parts of aqueous medium is usually desirable. The upper limit is dictated primarily by economic considerations. Generally a concentration in excess of 400 parts per million (hereinafter "p.p.m.") offers no advantage.

When an alkali metal halide such as sodium chloride is employed with the persulfate, it is typically used in an amount which will provide from about 100 to 600 p.p.m. of the said halide salt in the aqueous medium. Preferably the amount of halide salt is sufficient to provide 150 to 900 p.p.m. Halide salt concentrations greater than 900 p.p.m. generally do not give any further advantages.

The slimicidal treating agents used in the method of the invention may also contain, in addition to the active persulfate salt and optional halide salts, one or more adjuvants, which can be surface-active dispersing and solubilizing agents, stabilizers, binders, inert finely divided solids, or solvents or other liquid carriers. Depending upon the concentration of persulfate salt and the particular manner in which the invention is to be practiced, such compositions can be employed directly as the treating composition to be added to the aqueous system or can be employed as concentrate compositions and further diluted to produce the treating composition.

The slimicidal method of this invention provides nontoxic, odor free, non-foaming, non-polluting slime control in aqueous systems. The advantages of such a method are readily apparent.

The method of this invention is further illustrated by the following specific, but non-limiting, examples.

EXAMPLE 1

The method of this invention was evaluated in an air wash system located within a cigarette factory and having a water capacity of 35,000 gallons. Prior to this evaluation considerable fouling problems in the condensers and in the heat exchange tubes of the system had been experienced. It was estimated that the system was operating at about 30% below available capacity as a result of the fouling.

A dry blend of 50 percent by weight sodium sulfate and 50 percent potassium monopersulfate (Du Pont's "Oxone") was prepared.

The powder was added to the water in the above-described air wash system on an average of three days per week, over a period of four weeks, in varying amounts sufficient to provide between about 50 and about 170 p.p.m. of the total composition (thus about 25 to about 85 p.p.m. of active $KHSO_5$ ingredient) in the water. After about 8 days of this treatment abundant amounts of heavy slimy material began to slough off of the surfaces in the air wash system and accumulate in the sumps. Microscopic examination revealed heavy mold infestation, all in the vegetative form. One day during the course of this evaluation it was determined that microorganism count in the water in the air wash system was reduced by 67 percent, from 3 million to one million, within about 2 hours after adding 150 p.p.m. of the above composition (75 p.p.m. of active $KHSO_5$ ingredient).

Upon completion of the evaluation it was concluded that the system was much cleaner and that operation and efficiency had been considerably improved.

EXAMPLE 2

A sample of the accumulated slime collected in the course of the evaluation described in Example 1 was homogenized in a laboratory blender. Five 100 milliliter portions of the homogenized sample were treated as follows:

A—20 milligrams Oxone (200 p.p.m.)
B—10 milligrams Oxone (100 p.p.m.)
C—20 milligrams Oxone, 20 milligrams NaCl (200 p.p.m.)
D—20 milligrams Oxone, 10 milligrams NaCl (100 p.p.m.)
E—10 milligrams Oxone, 20 milligrams NaCl The Oxone treating agent was commercially available material containing approximately 50 weight percent of potassium monopersulfate active ingredient and 50 weight percent inert diluents (sodium sulfate). A blank was also carried through the experiment.

The six solutions (including the blank) were allowed to stand for 3½ hours, after which 8 dilutions of each sample were made. All were plated on a combination agar and examined for bacteria count and mold count after 48 hours of incubation. Results are given in Table I. The bacteria and mold counts shown represent, in each instance, the average count of the 8 separate dilutions for each of the samples.

TABLE I

|  | Average count (in thousands) per milliliter | | Percent kill | |
| --- | --- | --- | --- | --- |
|  | Bacteria | Mold | Bacteria | Mold |
| Control | 4,500 | 2,100 | | |
| Example: | | | | |
| 2A | 100 | 130 | 98 | 94 |
| 2B | 700 | 300 | 84 | 86 |
| 2C | 110 | 90 | 98 | 96 |
| 2D | 100 | 100 | 98 | 95 |
| 2E | 100 | 180 | 98 | 92 |

EXAMPLE 3

Another sample of the accumulated slime collected in the course of the evaluation described in Example 1 was homogenized as in Example 2. Separate aqueous treating solutions, one (Solution A) containing 0.5 weight percent sodium chloride, and the other (Solution B) a like concentration of a thoroughly blended mixture of equal parts sodium sulfate and Oxone (0.5 weight percent active potassium monopersulfate ingredient), were prepared. Separate samples of the homogenized slime were treated with these solutions as follows:

|  | Milliliters | | |
| --- | --- | --- | --- |
|  | Homogenized slime | Solution A | Solution B |
| Control | 100 | None | None |
| Sample: | | | |
| 3A | 92 | None | 8 |
| 3B | 96 | None | 4 |
| 3C | 84 | 8 | 8 |
| 3D | 88 | 4 | 8 |
| 3E | 88 | 8 | 4 |

These samples were allowed to stand for 24 hours after which 8 dilutions of each were made and plated on a nutrient plate. Results observed after 48 hours incubation are shown in the following Table 2.

TABLE 2

|  | Average bacteria count (in thousands) per milliliter | Percent bacteria killed |
| --- | --- | --- |
| Control | 2,000 | |
| Example: | | |
| 3A | 40 | 98 |
| 3B | 160 | 92 |
| 3C | 10 | 99.5 |
| 3D | 10 | 99.5 |
| 3E | 30 | 99.0 |

What is claimed is:

1. Method for controlling slime in an aqueous system which comprises adding to the water in said systems a slimicidal amount of a monopersulfate salt of the formula $$M(HSO_5)_x$$

wherein M represents ammonium, or a mono-, di- or trivalent metal cation and $x$ is equal the valence of the said cation.

2. Method as defined in claim 1 wherein the amount of monopersulfate salt is sufficient to provide from 50 to 300 parts per million thereof in the water in said system.

3. Method as defined in claim 2 in which there is provided 50 to 300 p.p.m. of monopersulfate salt.

4. Method as defined in claim 1 wherein M is a member of the group consisting of ammonium, sodium, potassium, calcium, barium, zinc, aluminum, or mixtures thereof.

5. Method as defined in claim 4 wherein said monopersulfate is potassium monopersulfate.

References Cited

UNITED STATES PATENTS 3,232,869  2/1966  Gard _____ 424—150

LEWIS GOTTS, Primary Examiner

C. L. MILLS, Assistant Examiner

U.S. Cl. X.R.

162—161; 210—64; 424—131, 145, 162